United States Patent [19]

Nakamura

[11] Patent Number: 4,558,486
[45] Date of Patent: Dec. 17, 1985

[54] SHIRRED CASING DELIVERY APPARATUS FOR MEAT PACKING SYSTEM

[76] Inventor: Minoru Nakamura, No. 27-6 Seta 1-chome, Setagaya-ku, Tokyo, Japan

[21] Appl. No.: 552,745

[22] Filed: Nov. 17, 1983

[30] Foreign Application Priority Data

Nov. 17, 1982 [JP] Japan ................................ 57-201289

[51] Int. Cl.$^4$ ............................................ A22C 11/02
[52] U.S. Cl. ......................................... 17/1 R; 17/35; 17/42
[58] Field of Search .................... 17/41, 42, 33, 35, 49, 17/1 R; 53/122, 576, 581, 582; 426/513

[56] References Cited

U.S. PATENT DOCUMENTS

| Re. 30,390 | 9/1980 | Kupcikevicius | 17/41 |
|---|---|---|---|
| 3,777,331 | 12/1973 | Falborg | 17/33 |
| 3,919,739 | 11/1975 | Kawai | 17/49 |
| 3,975,795 | 8/1976 | Kupcikevicius | 17/49 |
| 4,317,256 | 3/1982 | Senders | 17/41 |
| 4,437,209 | 3/1984 | Duroyon | 17/33 |
| 4,442,568 | 4/1984 | Petry | 17/33 |

FOREIGN PATENT DOCUMENTS

| 1177029 | 8/1964 | Fed. Rep. of Germany | 17/41 |
|---|---|---|---|
| 2645714 | 11/1977 | Fed. Rep. of Germany | 17/41 |

Primary Examiner—Willie G. Abercrombie
Attorney, Agent, or Firm—Yuter, Rosen & Dainow

[57] ABSTRACT

An apparatus for delivering the end of a shirred casing to the nozzle of a meat packing system where the casing is connected to the nozzle to be stuffed with meat extruded from the nozzle includes a support for supporting the shirred casing from the inner side thereof, a clamping unit for holding the end of the shirred casing opposite the nozzle by pressing the casing from within, a drive unit for advancing the clamping unit toward the nozzle and for retracting the clamping unit after the shirred casing is connected to the nozzle, and a resisting body which offers resistance to the folds in the wall of the shirred casing when the clamping unit is advanced or retracted, thereby to unfold the shirred casing into a straight tubular portion as relative movement is established between the casing and the resisting body. The meat extruded by the nozzle is stuffed into the tubular portion of the casing, after which the packed meat mass is encased by closing off and fastening the casing at both ends of the meat mass.

11 Claims, 13 Drawing Figures

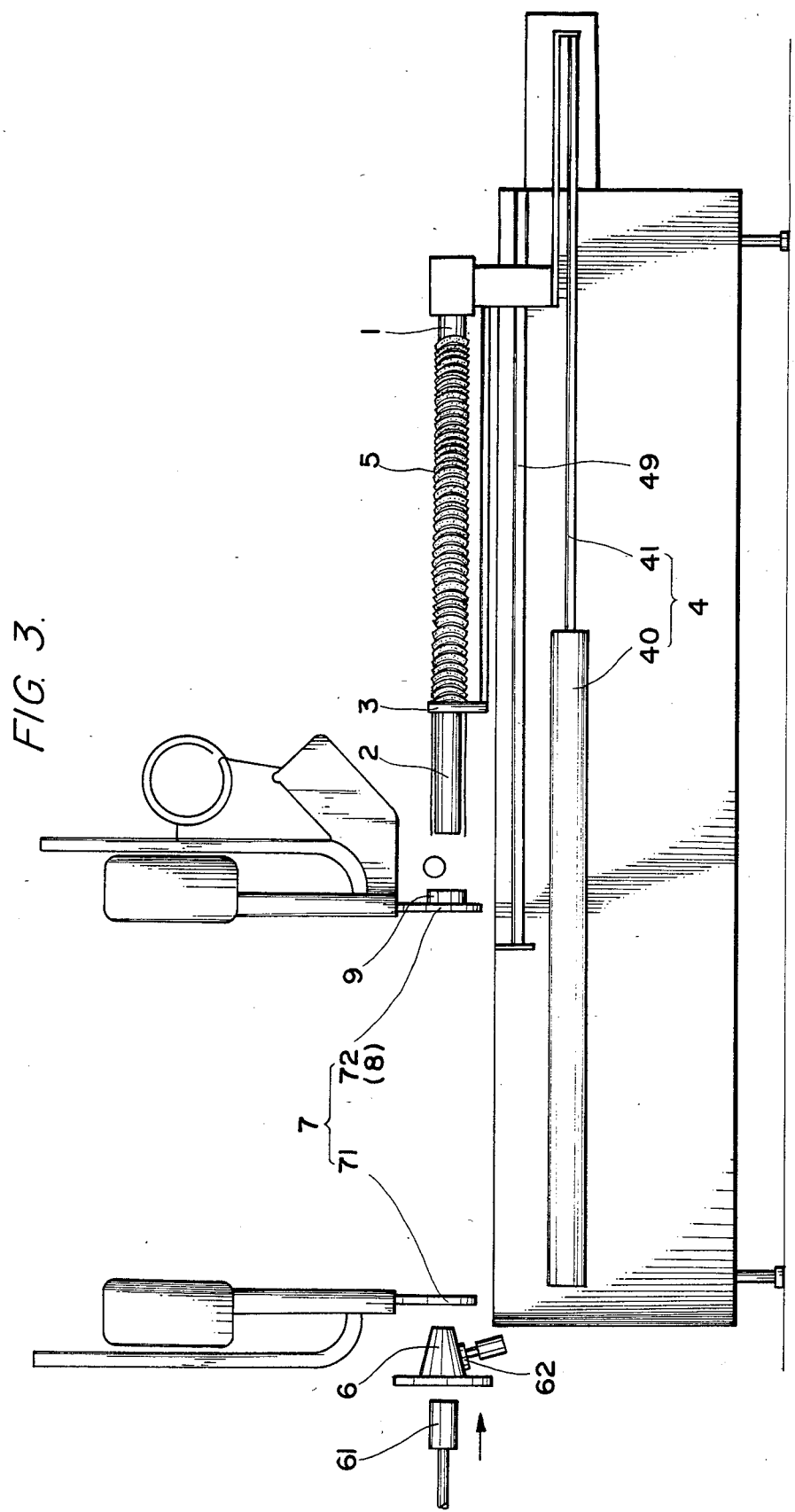

SHIRRED CASING DELIVERY APPARATUS FOR MEAT PACKING SYSTEM

BACKGROUND OF THE INVENTION

This invention relates to shirred casing delivery apparatus used in a meat packing system of the type in which a shirred casing is connected to a nozzle from which meat is extruded to stuff the casing, wherein the shirred casing is delivered to the nozzle for the connection thereto and formed into a straight, tubular configuration to create a space to be packed with the meat. The term "meat" as used herein is taken to mean all varieties of meat such as ham and sausage, as well as mixtures of meat, binder and other additives.

In the prior-art shirred casing delivery apparatus of the foregoing type, the shirred casing is supported while one end thereof is loosely fitted over the outer periphery of a nozzle. Pressure which is developed by stuffing the casing with meat extruded from the nozzle forms the casing into a straight, tubular configuration which is packed with the meat as the formation process proceeds. However, since the shirred casing is an extremely long casing which is folded back on itself longitudinally at a multiplicity of points to effect a reduction in length, the wall thickness of the shirred casing when folded is large in comparison with the diameter of the casing when fully extended. Since the nozzle is loosely fitted inwardly of the casing wall, a large difference develops between the inner diameter of the nozzle and the diameter of the straight tube into which the shirred casing is formed when the casing is extended by being stuffed with the meat. Owing to this large disparity in diameter, the meat extruded into the casing has a diameter which is much smaller than that of the straight, tubular portion, making it difficult to achieve tight packing of the casing. Proposed solutions to the problem are disclosed in Japanese Patent Application Laid-Open Nos. 50-32315 and 52-27715, which describe systems for packing a casing with meat by disposing a casing at a position forwardly of the direction in which meat is extruded from the nozzle and connecting the casing to the nozzle to effect the stuffing operation. In the disclosed arrangements, the casing is held sandwiched between an inner cylinder and an outer cylinder fitted over the inner cylinder. The casing is paid out toward the nozzle by driving the outer cylinder, with an assist from the action of an engaging member that engages the inner cylinder. Accordingly, the proposed arrangements have an extremely complicated operating mechanism and, being applicable solely to casings of a straight, tubular configuration, are not suitable for packing a shirred casing with meat.

SUMMARY OF THE INVENTION

An object of the present invention is to provide a shirred casing delivery apparatus for a meat packing system, which apparatus is simple in construction and easy to operate.

Another object of the present invention is to provide a shirred casing delivery apparatus for a meat packing system wherein a shirred casing can be continuously and automatically stuffed with a mass of meat having a diameter close to that of the casing diameter.

A further object of the present invention is to provide a shirred casing delivery apparatus for a meat packing system wherein economical use is made of the casing by eliminating excess casing length when the casing is severed.

According to the present invention, the foregoing objects are attained by providing a shirred casing delivery apparatus for a meat packing system of the type in which a shirred casing is connected to a nozzle from which meat is extruded to stuff the casing, the delivery apparatus comprising a support, a clamping unit, a drive unit and a resisting body.

The support is adapted to support a shirred casing, from the inner side thereof, at a position toward which meat is extruded from a nozzle of a meat packing system. No limitation is placed upon the shape of the support, which may for example be a cylinder or frame. The outer dimensions of the supporting surface, such as the outer diameter of a cylinder if this is the configuration adopted for the support, need not be highly precise. What is required is that the support be capable of supporting the shirred casing from its inner side. Accordingly, the support constituting the delivery apparatus of the invention is such as is capable of supporting any shirred casing irrespective of the inner diameter of the casing.

The clamping unit applies pressure to the inner side of the shirred casing, which is supported on the support, to hold the leading end of the casing opposite the end of the nozzle. Means for producing the holding force by applying pressure to the inner side of the casing are provided. For example, means are provided for pressing the inner wall of the casing by expanding within the casing in response to mechanical or hydraulic pressure. Since the leading end of the shirred casing is retained so that the drive unit may deliver this end of the casing to the nozzle for the connection thereto, it goes without saying that the holding force applied to the inner side of the casing by the clamping unit must be large enough to achieve the stated purpose. However, the holding force need only be applied when the clamping unit advances the casing forwardly, that is, toward the nozzle. During retraction, the holding force is removed or, if desired, applied only lightly.

The drive unit is connected to the clamping unit to advance the clamping unit toward the nozzle and then retract the clamping unit after the shirred casing is connected to the nozzle. Accordingly, the drive unit has a path for transmitting a driving force to the clamping unit to advance and retract the clamping unit interiorly of the shirred casing, the transmission path being located on the inner side of the shirred casing. With such a construction, the source of drive for the driving unit may be disposed on the inner or outer side of the shirred casing. However, the element which finally transmits the driving force to the clamping unit is connected to the clamping unit interiorly of the shirred casing.

The resisting body resistively engages the folds in the wall of the shirred casing during the advance or retraction of the clamping unit so that, owing to the relative movement between the shirred casing and the resisting body engaging the folded wall, the shirred casing is formed into a straight tubular portion defining a space into which meat is extruded for packing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a front view of a second embodiment of a shirred casing delivery apparatus according to the present invention as applied to a meat packing system;

DESCRIPTION OF THE PREFERRED EMBODIMENTS

Figure 1:
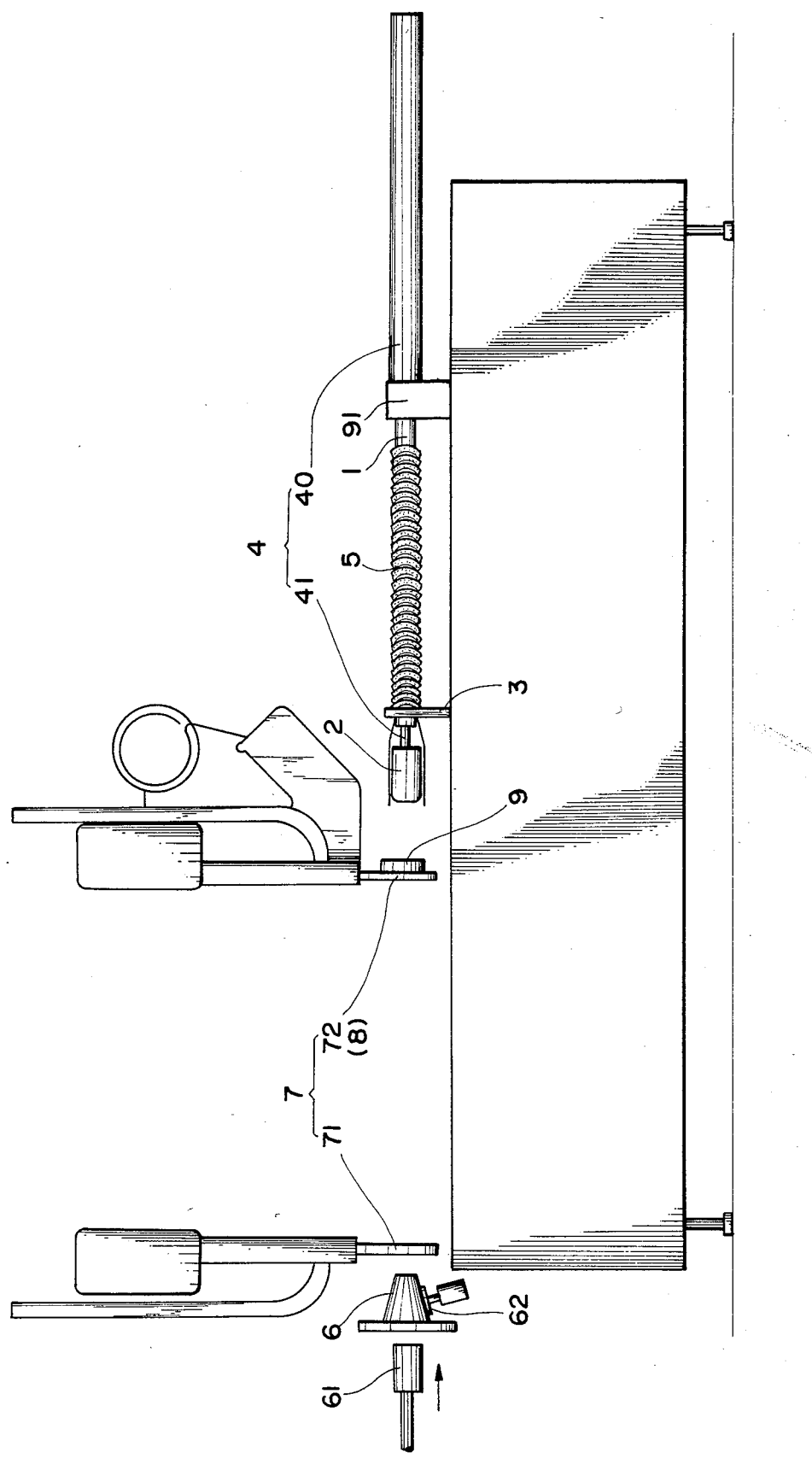
FIG. 1 is a front view of a first embodiment of a shirred casing delivery apparatus according to the present invention as applied to a meat packing system.

Reference will be had to the drawings to describe first and second embodiments of the present invention. FIG. 1, in addition to showing a first embodiment of the shirred casing delivery apparatus, also illustrates the overall meat packing system to which the apparatus is applied. FIG. 2 shows the arrangement of the shirred casing apparatus as well as the operation thereof.

As shown in FIG. 1, the shirred casing delivery apparatus includes a stationary support 1 of a cylindrical configuration for supporting a shirred casing 5 from the inner side thereof. A piston 61 operatively associated with a nozzle 6 of a meat packing system is adapted to extrude meat from the nozzle 6 in the direction of the arrow. The support 1, which is disposed at a position forwardly of the direction in which the meat is extruded from the nozzle 6, namely to the right of the nozzle, is fixedly attached to a holder 91. The exact position at which the support 1 is disposed is decided by setting the holder 91 at any suitable position determined in accordance with the quantity of meat to be stuffed into the casing 5. The delivery apparatus also includes a clamping unit 2 disposed within the shirred casing 5 at the forward end of the apparatus on the side of the nozzle 6. The clamping unit 2 will be described in further detail hereinbelow. Further included is a drive unit 4 mounted on the holder 91. The drive unit 4 comprises a cylinder 40 serving as a source of drive and accommodating a piston 42, and a rod 41 serving as a linearly movable element and connected at one end to the clamping unit 2 and at the other end to the piston 42. The rod 41 penetrates into the interior of the stationary support 1 and is reciprocated by the cylinder 40. Where the support 1 is a cylinder, as in the illustrated embodiment, the rod 41 is situated interiorly of the support. If the support were a member such as a simple frame or bar, then the rod 41 would be located within the shirred casing 5 and disposed in parallel with said member.

The shirred casing delivery apparatus also includes a stationary resisting body 3 forwardly of the support 1. Like the holder 91, the resisting body is set fixedly at a position which can be adjusted at will. Though the details are not illustrated, the resisting body 3 is adapted to close on the casing 5 from both sides thereof (i.e., in mutually opposing directions orthogonal to the plane of the drawing) so as to come into resistive abutting contact with the folds in the wall of the casing. Accordingly, when the clamping unit 2 is advanced as will be described below, the stationary resisting body 3 is engaged by the folds in the wall of the shirred casing 5 as the casing advances with the clamping unit, thereby causing the casing to unfold into a straight, tubular configuration, namely one having a substantially linear wall, on the front side of the resisting body 3, namely on the side thereof facing the nozzle 6.

The clamping unit 2 and drive unit 4 will be described in further detail with reference to FIGS. 5 and 6.

Figure 5:
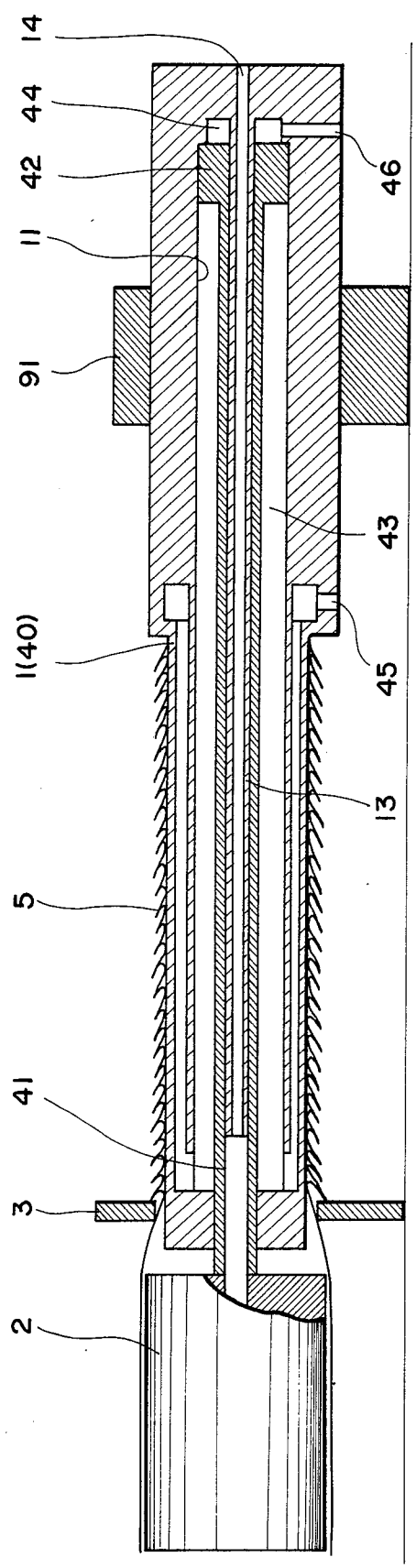
FIG. 5 is a sectional view showing in some detail the internal construction of a support and drive unit included in the apparatus of FIG. 1.
Figure 7:
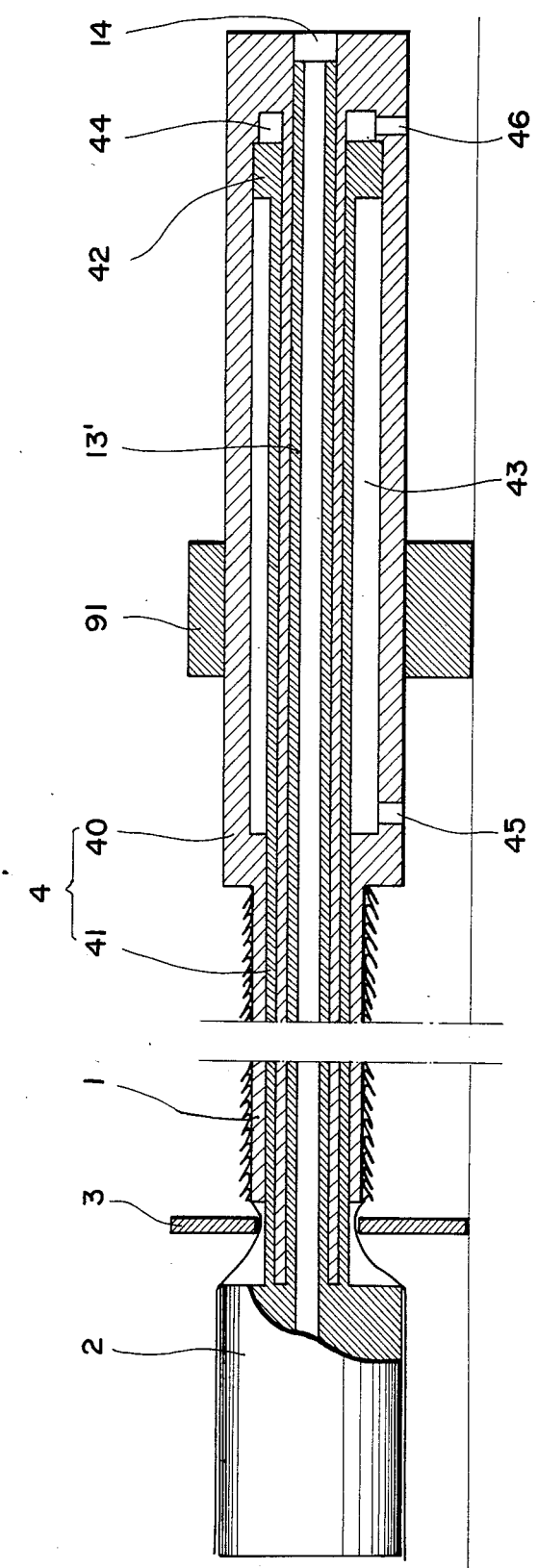
FIG. 7 is a sectional view showing in some detail the internal construction of a modification of the support and drive unit.

As shown in FIG. 5, the cylindrical support 1 is formed to include a cylinder chamber 11 accommodating the piston 42, whereby the drive source 40 is constructed. The rod 41 is connected at one end to the piston 42 and at the other or forward end to the clamping unit 2, described hereinbelow. Delimited within the cylinder chamber 11 at the front and back sides of the piston 42 are respective pressure chambers 43, 44 communicating with respective pressurizing ports 45, 46 formed in the wall of the support 1 for introducing hydraulic pressure to the pressure chambers. Inserted into the rod 41, which is hollow, is a guide pipe 13 formed integral with the support 1. The rod 41 is capable of sliding along the guide pipe 13. The guide pipe 13, constituting a transmission element, receives hydraulic pressure introduced from a separate hydraulic pressure source through a pressurizing port 14 located at the rear end of the support 1, and transmits the pressure as a linearly and leftwardly acting force to a clamping mechanism 22 constituting the clamping unit 2. In a modification of the invention illustrated in FIG. 7, the transmission element may comprise a guide pipe 13' formed integral with the clamping unit 2.

Figure 6:
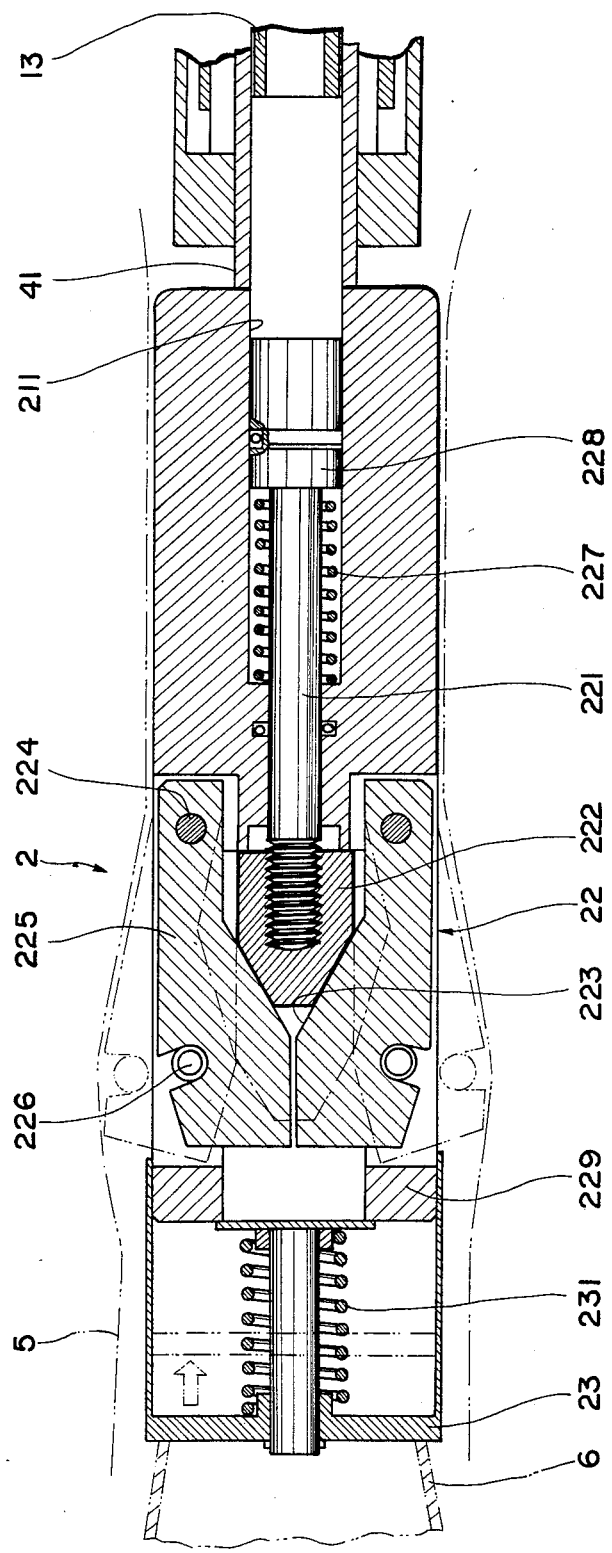
FIG. 6 is a sectional view showing in some detail the construction of a clamping unit included in the apparatus of FIG. 1.

As shown in FIG. 6, the clamping mechanism 22 comprises a piston 228 which undergoes leftwardly directed linear motion within the cylinder chamber 211 of the clamping unit 2 in response to the hydraulic pressure introduced from the guide pipe 13 serving as the tranmission element, a rod 221 connected at one end to the front side of the piston 228, a conical member 222 attached to the other or forward end of the rod 221, and an expansion member 225 which has a concave conical surface 223 in abutting surface contact with the conical member 222, and which is rotatable about a pin 224. Thus the expansion member 225 is adapted to expand or protrude outwardly of the clamping unit 2 to the position shown by the phantom lines as the piston 228 is advanced to the left in FIG. 6, as also indicated by the phantom lines. Such protrusion of the expansion member 225 brings the expansion member into contact with the inner surface of the casing 5, as indicatad by the phantom lines, thereby applying a holding force to the casing 5 into which the clamping unit 2 is inserted. The clamping mechanism 22 further includes a spring 226 encircling the expansion member 225 for restoring the latter to its original (reclined) position, which is the position indicated in FIG. 6, when the hydraulic pressure is withdrawn from the pressure chamber 44 (FIG. 5) through the pressurizing port 14, and a spring 227 fit over the rod 211 and interposed between the front side of the piston 228 and the left-hand wall of the cylinder chamber 211 for urging the piston 228 backward to its original position when the hydraulic pressure is withdrawn as described.

The clamping unit 2 is provided at its tip with a head 23 disposed slidably on a frame 229 constituting the expansion member 225. When brought into abutting contact with the nozzle 6 of the packing system as the clamping unit 2 is advanced, the head 23 slides backwardly on the frame 229 and recedes within the casing 5 so that the casing protrudes from the head. This facilitates the operation of fitting the end of the casing over the nozzle 6.

Returning to FIG. 1, a chuck 62 associated with the meat packing system is operable to clamp the end of the shirred casing 5 against the outer side of the nozzle 6 over which the casing is to be fitted. Reference numeral 7 designates fastening means comprising first and second fastening units 71, 72 for successively closing and fastening the casing at both ends of a meat mass after the meat has been stuffed into a straight, tubular portion of the casing from the nozzle 6. The second fastening unit 72 houses a constricting mechanism (not shown) constituting constricting means 8 for squeezing or constricting the casing 5, and is further provided with cutting means 9 closely adjacent to the back side of the constricting means 8 for cutting off a segment of the casing. As will be described hereinbelow, the clamping unit 2 is retracted after the casing has been connected to the nozzle 6. In order to stuff the casing with meat tightly before the operation of the second fastening unit 72, it is preferred that the clamping unit 2 be designed to make a second retraction in cooperation with the constricting operation performed by the constricting means 8. When the clamping unit 2 is retracted the second time, it is essential that the holding force applied to the inner surface of the casing 5 be of sufficient strength.

Figure 2A:
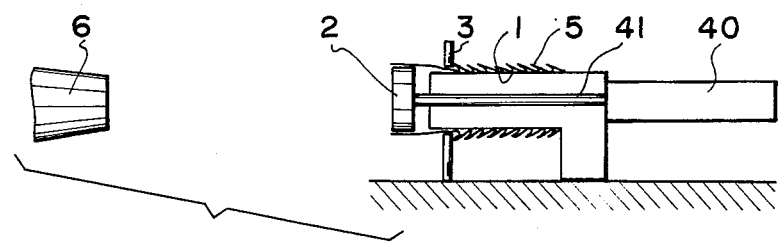
FIGS. 2A,B,C and D are simplified sectional views illustrating the arrangement and operational sequence of the apparatus shown in FIG. 1.

The operation of the first embodiment of the invention will be described in conjunction with FIG. 2. The first step is to support the shirred casing 5 on the support 1 and pull the front end of the casing onto the clamping unit 2 through the resisting body 3 so that the clamping unit may hold the casing in place. The clamping unit 2 is operated by hydraulic pressure. The hydraulic pressure, when applied to the pressurizing port 14, is introduced into the guide pipe 13 and thrusts the piston 228 forward against the force of the spring 227. The forward or advancing motion of the piston 228 is transmitted to the conical member 222 through the rod 221, whereby the conical member 222 is advanced. As a result, the expansion member 225, which is in abutting surface contact with the conical member 222, is rotated outwardly about the pin 224 against the force of the surrounding spring 226, thereby holding the shirred casing 5 from the inner side thereof. This is illustrated in FIG. 2A.

Figure 2B:
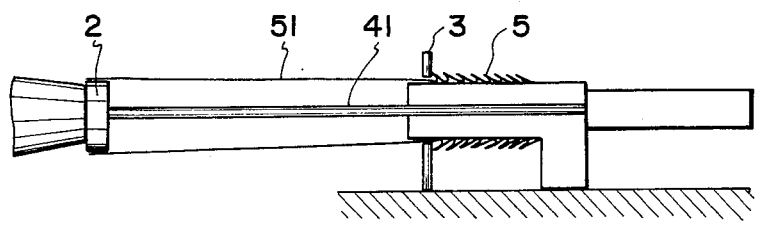

Next, hydraulic pressure is admitted into the pressure chamber 44 on the back side of the piston 42 through the pressurizing port 46, thereby advancing the piston 42 and, hence, the clamping unit 2 through the rod 41 connecting the piston 42 with the clamping unit. This step is shown in FIG. 2B. When the clamping unit 2 advances, the folded wall of the shirred casing 5 meets resistance offered by the resisting body 3. Owing to the movement of the shirred casing 5 relative to the resisting body 3 as the clamping unit 2 advances, the shirred casing 5 is unfolded and formed into a straight tubular portion 51 at the front of the resisting body 3. Hydraulic pressure continues to be introduced into the pressure chamber 44 to advance the clamping unit 2 further to the left, with the head 23 of the clamping unit 2 eventually coming into abutting contact with the nozzle 6 of the packing system. As the clamping unit 2 is advanced under these conditions, the head 23 is pressed backwardly by the nozzle 6 into the casing 5 against the force of the spring 231, so that the leading end of the casing projects beyond the front end of the head 23. When the protruding end of the casing 5 has been fitted over the tip of the nozzle 6, the hydraulic pressure within the cylinder chamber 11 of the drive source is withdrawn through the port 46 to halt the forward motion of the clamping unit 2. This is followed by actuating the chuck 62 of the meat packing system to clamp the casing 5 against the side of the nozzle 6 to effect the connection between the two. Preferably, the introduction of hydraulic pressure into the guide pipe 13 is suspended simultaneously with the operation of the chuck 62 in order to recline the expansion member 225 and, hence, free the casing 5 from the holding force applied by the clamping unit 2.

Figure 2C:
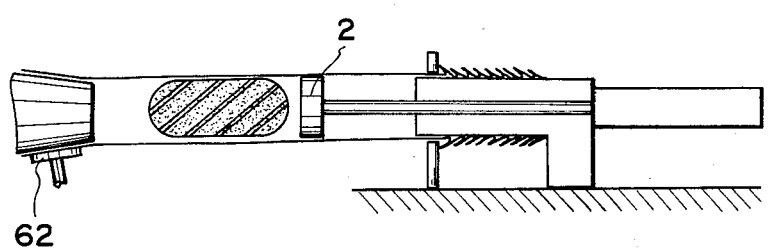

When the casing 5 has been connected to the nozzle 6 in the above-described manner, hydraulic pressure is introduced into the pressure chamber 43 on the front side of the piston 42 through the pressurizing port 45, thereby retracting the piston 42 and, hence, the clamping unit 2. As shown in FIG. 2C, the clamping unit 2 is retracted far enough to permit the casing to be stuffed with meat, after which packing takes place by extruding the meat into the straight tubular portion 51 of the casing from the nozzle 6 by the action of the piston 61.

Figure 2D:
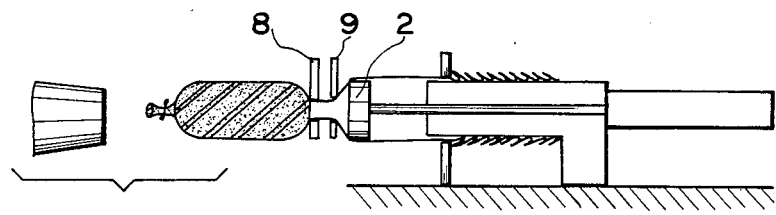

Thereafter, the casing 5 on the nozzle side of the extruded meat mass is closed and fastened by the first fastening unit 71, and the chuck 62 is withdrawn from the nozzle. This is followed by actuating the constricting means 8 to constrict the casing 5 on the other or right side of the extruded meat mass, in cooperation with which the clamping unit 2 is again retracted by withdrawing hydraulic pressure from the pressure chamber 44, thereby tensioning the casing 5 to assure that the meat mass stuffed therein will be tightly encased. It should be noted that the clamping unit 2 is again actuated to subject the casing to a holding force when this second retraction operation is performed. Following the tensioning of the casing 5, the second fastening unit 72 is operated to close and fasten the right side of the encased meat mass, after which this side of the casing is cut off by the cutting means 9. This completes one packing cycle, the final steps of which are as shown in FIG. 2D.

Thus, in accordance with the first embodiment of the present invention, the support 1 and clamping unit 2 are of separate construction, and the support 1 is fixed against movement. Only the clamping unit 2 is reciprocated, i.e., advanced and retracted, by the drive unit 4. The resisting body 3, which is stationary like the support 1, offers resistance to the folds in the wall of the shirred casing 5 when the clamping unit 2 is advanced, and thus functions to unfold the casing into a straight, tubular portion as the casing is carried by the clamping unit.

Reference will now be had to FIGS. 3 and 4 to describe a second embodiment of a casing delivery apparatus according to the present invention. This embodiment is distinguishable over the first primarily in that the support 1 and clamping unit 2 are formed as a unitary body and, hence, move in unison. The resisting body 3, which is attached to the support 1, moves together with the support and, consequently, in unison with the clamping unit 2. Accordingly, the linearly movable element 41, namely the rod 41 that drives the clamping unit 2, need only be connected to the support 1. The latter is guided along a guide bar 49 and has the rod 41 connected to its lower end for being driven by the cylinder 40 of the drive source. In the illustrated arrangement, the driving force is transmitted to the clamping unit 2 through the interior of the shirred casing 5 by the support 1 formed integral with the clamping unit. Owing to these structural differences which distinguish this arrangement over that of the first embodiment, the principle of operation differs with respect to the formation of the straight portion 51 of the casing 5. This will be described with reference to FIG. 4.

Figure 4A:
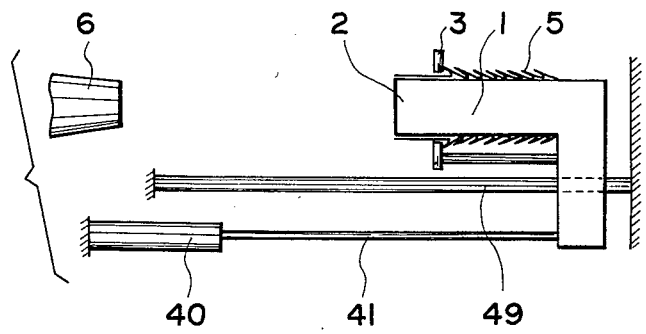
FIGS. 4,A,B,C and D are simplified sectional views illustrating the arrangement and operational sequence of the apparatus shown in FIG. 3.
Figure 4B:
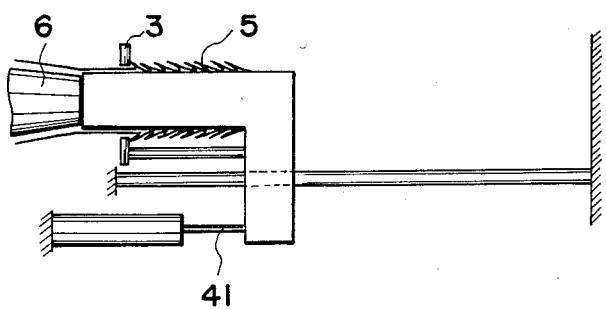
Figure 4C:
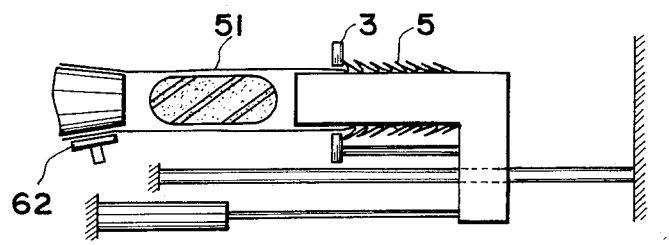
Figure 4D:
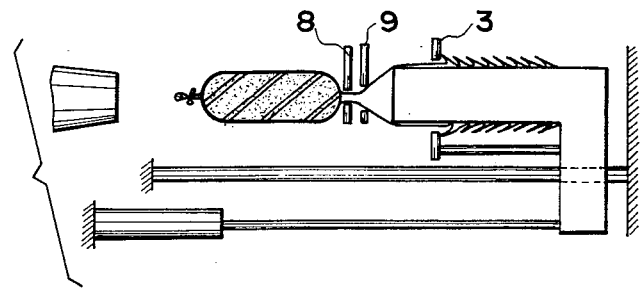

The clamping unit 2 and support 1, starting from the condition shown in FIG. 4A, move forward toward the nozzle 6 as the rod 41 is advanced, the support 1 being guided along the guide bar 49. The casing 5 travels forwardly with the support 1, clamping unit 2 and resisting body 3 and is as yet not formed into a straight tubular portion. In FIG. 4B, the clamping unit 2 is brought into contact with the nozzle 6 to connect the casing 5 to the nozzle in a manner similar that performed in the arrangement of the first embodiment. After the connection, the clamping unit 2 and support 1 are retracted, at which time the resisting body 3 is also retracted in unison with these elements owing to its being attached to the support 1. Since the leading end of the casing 5 is firmly clamped onto the nozzle 6, the retraction of the resisting body 3 brings it into abutting contact with the folds in the wall of the shirred casing 5 as the casing is pulled off the retracting support 1. Thus, the retracting resisting body 5 in effect pulls the folds out of the casing 5 and forms the casing into the straight tubular portion 51 on the front side of the resisting body 3. This is followed by packing meat into the straight portion 51 of the casing by extruding the meat from the nozzle 6 [FIG. 4C], and enclosing the meat mass within the casing [FIG. 4D] through steps similar to those described in connection with the first embodiment of the invention.

Thus, the shirred casing delivery apparatus of present invention as described and illustrated hereinabove operates by disposing the shirred casing 5 at a position forwardly of the direction in which the meat is extruded from the nozzle 6, holding the casing from the inner side thereof by the clamping unit 2 on the side facing the nozzle, advancing the clamping unit 2 to connect the casing 5 to the nozzle 6, and forming the casing into the straight tubular portion 51. This allows the casing to be packed with meat extruded from the nozzle the inner diameter whereof approximates that of the straight tubular portion 51, thereby improving packing efficiency to a great degree. In addition, the effectiveness of the overall operation is enhanced because packing is performed continuously in automatic fashion. Further, since the apparatus enables shirred casings of different inner diameters to be packed with meat without requiring any changing of parts, the apparatus is simplified in construction and made easier to use.

As many apparently widely different embodiments of the present invention can be made without departing from the spirit and scope thereof, it is to be understood that the invention is not limited to the specific embodiments thereof except as defined in the appended claims.

What I claim is:

1. A shirred casing delivery apparatus for a meat packing system in which a shirred casing is connected to a nozzle and packed with meat extruded from the nozzle, comprising:

supporting means for supporting the shirred casing from the inner side thereof at a position forward of the direction in which the meat is extruded from the nozzle;

clamping means for holding said shirred casing at an end of the casing facing the nozzle by pressing the shirred casing from the inner side thereof; said clamping means being adapted to reversibly expand within said casing;

drive means for advancing said clamping means holding said casing end toward the nozzle to connect said end of the shirred casing to the nozzle and for subsequently retracting said clamping means; and resisting means for engaging the wall of the shirred casing when said clamping means is moved in said advancing and retracting directions, and for forming the shirred casing into a straight tubular portion.

2. The shirred casing delivery apparatus according to claim 1, wherein said resisting means resistively engages the wall of the shirred casing, movement of said casing past said resisting means forming said casing into said straight tubular portion.

3. The shirred casing delivery apparatus according to claim 1, wherein said clamping means includes a head portion brought into abutting contact with the nozzle when said clamping means is advanced, upon said contact said head portion receding within the shirred casing to project the end of the shirred casing beyond said head portion in order to be fitted over the nozzle.

4. The shirred casing delivery apparatus according to claim 1, wherein said drive means includes:

a linearly movable element connected to said clamping means and penetrating the interior of the shirred casing supported by said supporting means, said supporting means being stationary; and a drive source for driving said linearly movable element from behind to reciprocate said element;

said resisting means being stationary and resistively engaging the wall of the shirred casing when the shirred casing is advanced.

5. The shirred casing delivery apparatus according to claim 1, wherein said supporting means and resisting means are advanced and retracted together with said clamping means, said resisting means resistively engaging the wall of the shirred casing when the shirred casing is advanced.

6. The shirred casing delivery apparatus according to claim 1, wherein said clamping means is adapted to subject the inner side of the shirred casing to a holding force of a prescribed magnitude when said clamping means is advanced, and to a holding force less than the prescribed magnitude when said clamping means is retracted.

7. The shirred casing delivery apparatus according to claim 6, wherein said clamping means is retracted again to tension the straight tubular portion of the shirred casing after said portion is packed with meat, at which time the holding force applied to the inner side of the shirred casing is again increased in magnitude.

8. The shirred casing delivery apparatus according to claim 1, wherein said clamping means includes a clamping mechanism for converting a linear force, received from a transmission element in juxtaposition with a linearly movable element, into a holding force directed outwardly of said clamping means, the conversion being effected within the shirred casing.

9. The shirred casing delivery apparatus according to claim 2, wherein said linearly movable element comprises a hollow rod connected to a piston movable linearly in a cylinder chamber, said guide pipe is inserted into the hollow interior of said rod, and said supporting means is constituted by an outer circumferential wall of said cylinder chamber.

10. A shirred casing delivery apparatus for a meat packing system in which a shirred casing is connected to a nozzle and packed meat extruded from said nozzle, comprising:

supporting means for supporting the shirred casing from the inner side thereof at a position forward of the direction in which the meat is extruded from the nozzle;

clamping means for holding said shirred casing at an end of the casing facing the nozzle by pressing the shirred casing from the inner side thereof;

drive means for advancing said clamping means holding said casing end toward the nozzle to connect said end of the shirred casing to the nozzle and for subsequently retracting said clamping means; said drive means including, a linearly movable element for advancing and retracting the clamping means, resisting means for engaging the wall of said shirred casing when said clamping means is moved in said advancing and retracting directions and for forming the shirred casing into a straight tubular portion;

said clamping means including a clamping mechanism for converting a linear force received from a transmission element in juxtaposition with said linearly movable element, into a holding force directed outwardly of said clamping means, the conversion being effected within the shirred casing, said transmission element comprising a guide pipe provided in said linearly movable element for transmitting hydraulic pressure.

11. The shirred casing delivery apparatus according to claim 10, wherein said iinearly movable element comprises a hollow rod connected to a piston movable linearly in a cylinder chamber, said guide pipe being connected at its front end to the clamping means and being inserted coaxially into the hollow interior of said rod forming an annular gap between said rod and guide pipe, and a portion of the cylinder being inserted into said annular gap formed between the rod and the guide pipe allowing relative motion between said rod and guide pipe and said cylinder wall.

* * * * *